United States Patent [19]

Hughes

[11] Patent Number: 4,895,424

[45] Date of Patent: Jan. 23, 1990

[54] OPTICAL FIBRE ADAPTER MEANS FOR COUPLING OPTICAL SIGNALS

[75] Inventor: Howard G. Hughes, Abergele, Wales

[73] Assignee: Pilkington Communications Systems Limited, United Kingdom

[21] Appl. No.: 244,263

[22] Filed: Sep. 14, 1988

[30] Foreign Application Priority Data

Sep. 25, 1987 [GB] United Kingdom ............... 8722553

[51] Int. Cl.⁴ .............................................. G02B 6/36
[52] U.S. Cl. ................................................. 350/96.20
[58] Field of Search ............... 350/96.20, 96.21, 96.22

[56] References Cited

U.S. PATENT DOCUMENTS

| | | | |
|---|---|---|---|
| 4,362,360 | 12/1982 | Mannschke | 350/96.20 |
| 4,585,302 | 4/1986 | Schoen | 350/96.20 |
| 4,699,454 | 10/1987 | Brubaker | 350/96.20 |
| 4,779,948 | 10/1988 | Wais et al. | 350/96.10 X |
| 4,804,243 | 2/1989 | Borsuk et al. | 350/96.20 |

FOREIGN PATENT DOCUMENTS

| | | |
|---|---|---|
| 8504492 | 10/1985 | PCT Int'l Appl. |
| 2015766 | 9/1979 | United Kingdom |
| 2078391 | 1/1982 | United Kingdom |
| 2098354 | 11/1982 | United Kingdom |

Primary Examiner—William L. Sikes
Assistant Examiner—Akm E. Ullah
Attorney, Agent, or Firm—F. Eugene Davis, IV

[57] ABSTRACT

A two-part optical fibre adapter means suitable for coupling optical signals in electronic shelf assemblies incorporating plug-in circuit boards for high density racked optical systems. One part of the adapter means is mounted in an aperture in a support member and has a thread which is provided for attachment of an optical-fibre connector. The other part incorporates a light-emitting diode and is resiliently mounted by means of a helical spring in an aperture in a further support member. The other part which takes the form of a spigot slidably locates in a bore of the one part and cooperates with a pin of the optical fibre connector which is attached to the one part. A plurality of the optical-fibre adapter means are mounted on an equipment shelf back-plane and a printed circuit board. Use of adapter means of this type eliminates the requirement for inter-link cables between the back-plane and the p.c.b. which have been required hitherto in such equipment-shelf assemblies.

20 Claims, 5 Drawing Sheets

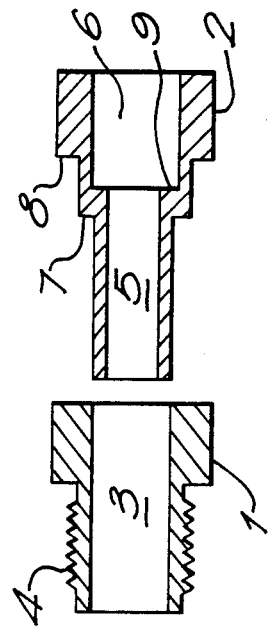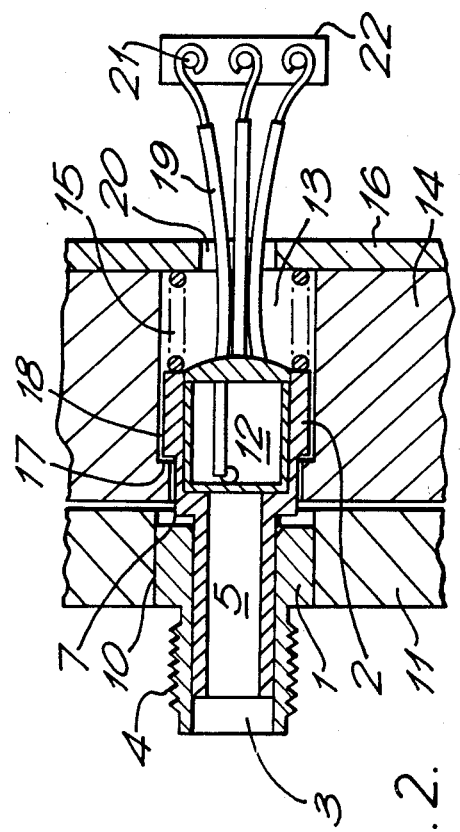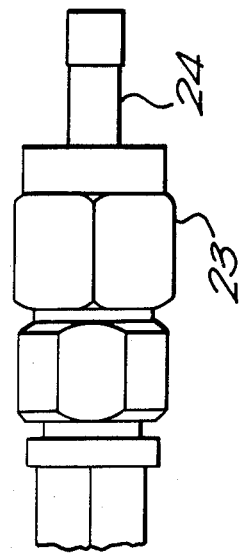
FIG.1.
FIG.2.

OPTICAL FIBRE ADAPTER MEANS FOR COUPLING OPTICAL SIGNALS

BACKGROUND OF THE INVENTION

The present invention relates to a two-part optical fibre adapter means.

This invention is emimently suitable for coupling optical signals in electronic shelf assemblies incorporating plug-in printed circuit boards particularly, although not exclusively, for high density racked optical systems.

A problem with optical fibre connection schemes employing, say, SMA and ST type connectors is that they are not designed with high density racked optical systems in mind.

In a large racked system, for instance, for efficient cable management it is preferable for the optical fibre connections to be from the rear of the printed circuit board frames. Where conventionally mounted active devices e.g. light emitting diodes and photo detectors are employed, in order to remove a printed circuit board, it is necessary to part, or completely withdraw a printed circuit board from the frame to demate the optical terminations, from the active devices mounted on the board.

A disadvantage of this arrangement is that it is a time-consuming operation and it gives rise to a further disadvantage in that the cable management arrangement must provide enough cable slack to allow at least partial card removal to demate the optical terminations. Once demated these terminations are potentially vulnerable to damage, or contamination. Additionally it is also quite possible they could drop within the card frame and cause electrical short circuits.

An object of this invention is to provide an optical fibre adapter means which overcomes the beforementioned disadvantages in an efficient manner and which enables active printed circuit board devices to be interfaced to any standard optical fibre connectors.

SUMMARY OF THE INVENTION

According to the present invention there is provided a two-part optical fibre adapter means in which one part is adapted for mounting on a support member and for attachment thereto of an optical fibre connector, and the other part which incorporates an active opto-electronic device is adapted for resiliently mounting on a further support member to enable alignment with and slideable location within said one part for direct coupling between the active opto-electronic device and the optical fibre connector.

Preferably the one part is of cylindrical configuration and has a central through-bore and is firmly secured within an aperture incorporated in the support member. The support member preferably carries several such parts.

the one part may be adapted, by means of an external thread, to enable attachment to one of its ends, of the optical fibre connector. Desirably the optical fibre connector is of the male type where the central protruding pin locates loosely and centrally within the central through-bore of said one part.

Advantageously, the other part, which preferably has the form of a spigot, is not secured firmly within an aperture on the further support member, but is held usually in one position by axially effective resilient means and is free to move longitudinally against the resilient means, and laterally as a consequence of a differential in the diameter dimensions of the aperture and the spigot itself.

Conveniently the spigot is of an increasing diameter stepped cylindrical configuration and incorporates a central through-bore which opens into a cavity at the larger diameter end of the spigot. The cavity is adapted for containment of the active opto-electronic device such as a light emitting diode or a photo-detector.

conveniently a first step of the spigot is provided for limiting the degree of isnertion of the spigot within the central bore of the one part, whereas a second step is provided for containing the spigot within the aperture on the further support member under the pressure of the resilient means, which preferably takes the form of a helical spring contained in the further support member by a securing means such as a plate.

The support member may comprise a plate which incorporates at least one pin which is arranged for co-operation with an appropriately positioned hole within the further support member. Such pins and holes may be provided to assist accurate alignment of the two-part adapter means.

Conveniently, the support member is mounted adjacent one part of a standard printed circuit board electrical connector, e.g. of the DIN 41612 type, on a back-plane assembly of an electronic equipment shelf.

The further support member can be mounted adjacent the corresponding cooperating other part of the standard printed circuit board electrical connector on a plug-in printed circuit board assembly. Thus, as the printed circuit board assembly is slidably inserted, or removed from the equipment shelf, the two-part adapter means slidably engages or disengages respectively.

The invention further provides a two-part optical-fibre adapter means as set forth above in combination with an electronic equipment shelf assembly including a back-plane and slidably mounted plug-in printed circuit boards for direct coupling between active opto-electronic devices on the printed circuit board and optical fibre connector means on the back-plane.

The invention will be better understood from the following description of an exemplary embodiment which should be read in conjunction with the accompanying drawings, in which;

BRIEF DESCRIPTION OF THE DRAWINGS

FIG. 1 shows a sectional view of the two-part adapter means
according to this invention;

FIG. 2 shows a sectional view of the two-part adapter means
mounted on the support means and further support means
respectively according to this invention;

DESCRIPTION OF PREFERRED EMBODIMENT

Figure 3:
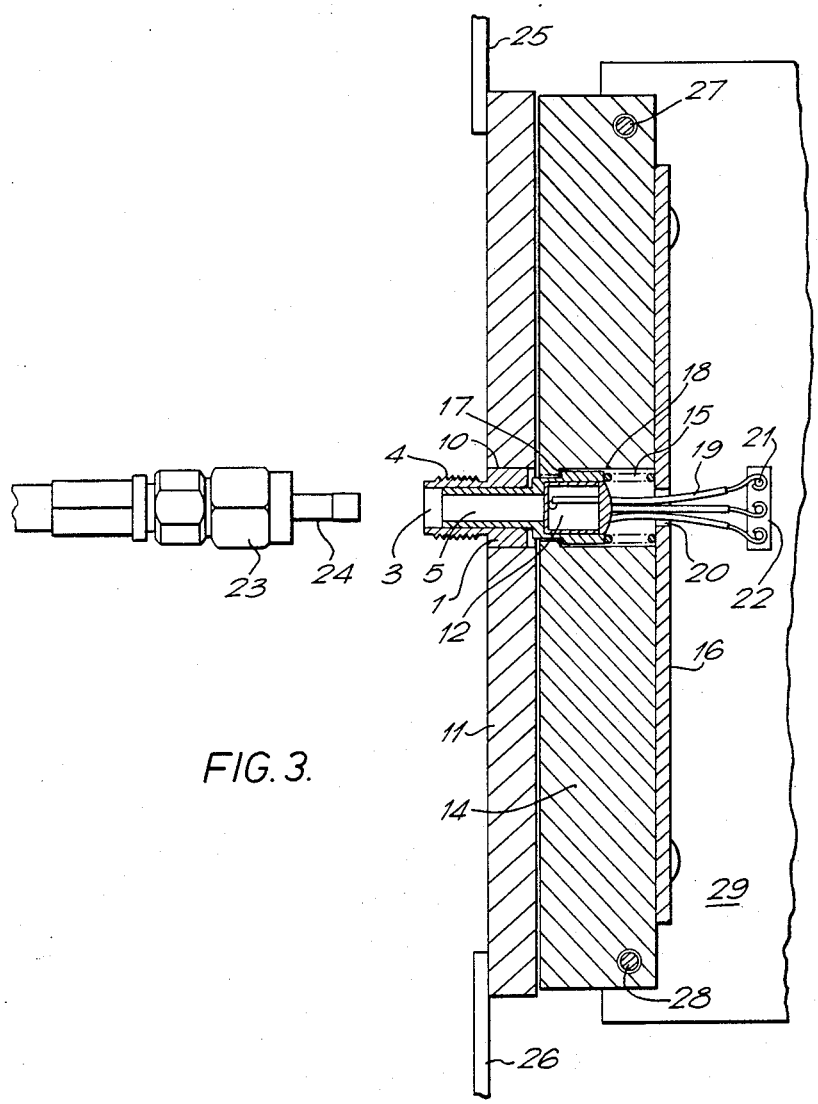
FIG. 3 shows a sectional view of the two-part adapter
mounted on a back-plane assembly and a printed circuit board
respectively of an electronic equipment shelf.

Referring to the drawings, in FIG. 1 the two main parts 1 and 2 of the adapter are shown. One part 1, which is generally of cylindrical configuration, incorporates a central through-bore 3 and an external threaded portion 4. The other part 2, is also of cylindrical configuration and takes the form of a spigot. The spigot 2, also incorporates a central through-bore 5 which opens into a cavity 6 at one end of the spigot. The spigot 2 incorporates two external stepped regions 7 and 8 of increasing diameter while the cavity 6, which is at the large diameter end, has an internal shoulder 9.

FIG. 2 has the two-part adapter means fitted together with each part mounted on its respective support member. The one part 1, is secured within an aperture 10 on a support member 11 as a consequence of an interference fit with the aperture. The other part 2, the spigot, contains an active opto-electronic or electro-optical device i.e. a light emitting diode 12 within the cavity 6. The spigot 2 is resiliently mounted within an aperture 13 on a further support member 14 by means of a helical spring 15 providing axial pressure against the spigot 2. The spring 15 and spigot 2 are contained with in the aperture 13 by means of a securing plate 16.

The spigot is held against an internal shoulder 17 of the aperture 13 by the spring 15 and longitudinal movement is possible in one direction against the pressure of the spring 15 when necessary, particularly when an optical fibre connector described below is inserted and screwed home until tight. This is when the pin of the connector enters the spigot, the shoulder on the pin comes into contact with the end of the spigot which moves it against the pressure of the spring.

A degree of lateral movement of the spigot can be obtained as a result of a gap 18 present between the spigot 2 and the wall of the aperture 13 as a consequence of a differential in the diameters of the large end of the spigot 2 and the aperture 13. This lateral movement aids accurate alignment of the spigot with the aperture 3 of the one part 1 of the adapter.

As will be seen in FIG. 2, electrical connections such as 19 emanating from the light emitting diode 12 pass through a suitably positioned opening 20 in the support member 16 and are terminated on tags such as 21 on a tag strip 22. This tap strip 22 is connected with, and supported by, a printed circuit board (described below with reference to FIG. 3, FIG. 4, FIG. 5 and FIG. 6).

The one part 1 of the adapter means is arranged to receive a standard optical fibre connector 23 of the types known as SMA, ST etc., the protruding pin 24 locating snugly within the central through-bore 5 of the spigot 2. The optical fibre connector is retained securely in position by the appropriate part of the connector being tightened on the threaded portion 4 of the one part 1 of the adapter.

By this arrangement, the adapter means is enabled to couple optical signals directly from an active opto-electronic device, e.g. a light emitting diode 12 to an optical fibre connector 23 without the necessity of an optical fibre link involving the customary cable slack.

Referring now to FIG. 3, FIG. 4, FIG. 5 and FIG. 6 it should be understood that like component parts as referred to in FIG. 1 and FIG. 2 have been designated with identical numerals as referred to in FIG. 1 and FIG. 2. In FIG. 3 the support member 11 is shown secured to an upper rail 25 and a lower rail 26 of an equipment shelf back-plane. The further support member 14 is shown secured by means of screws 27 and 28, to a plug-in printed circuit board 29.

Figure 4:
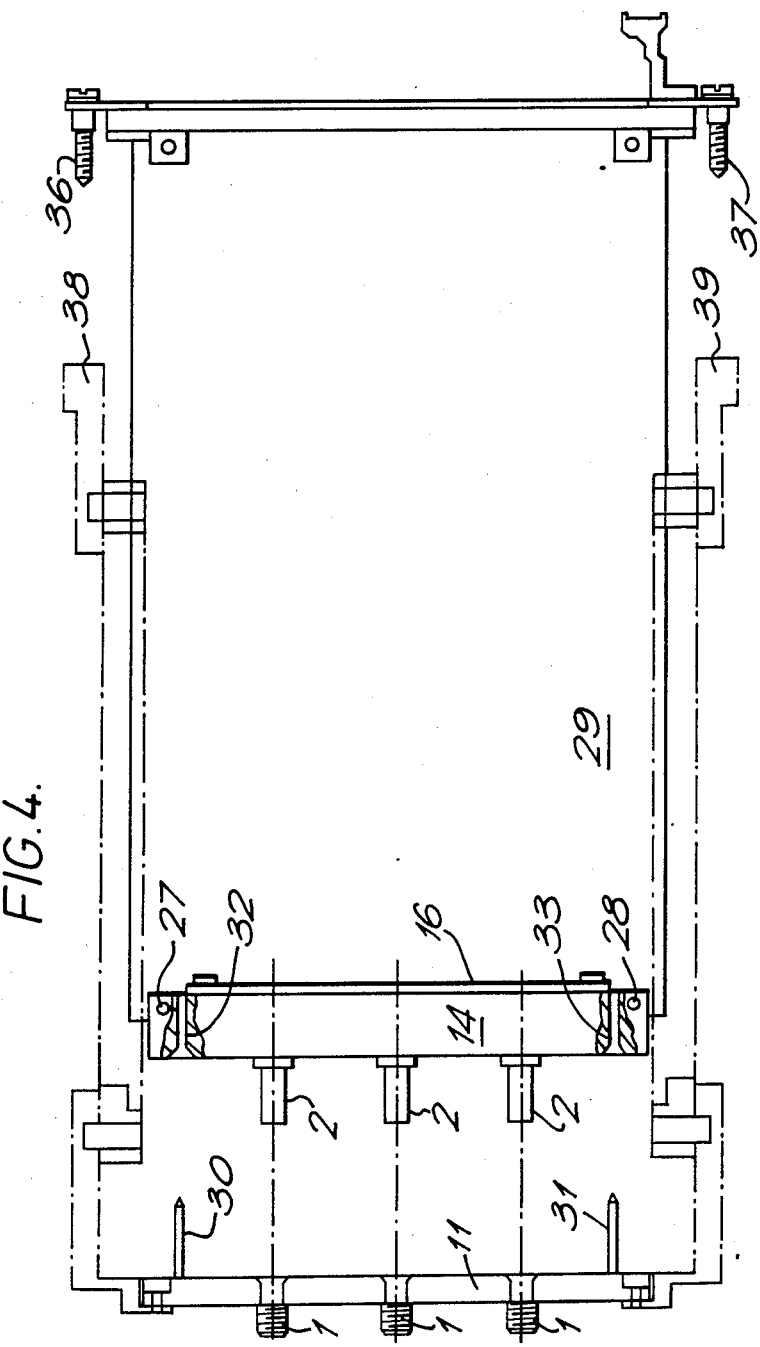
FIG. 4 shows a front-elevation of a back-plane and printed
circuit board incorporating several two-part adapter means.
Figure 5:
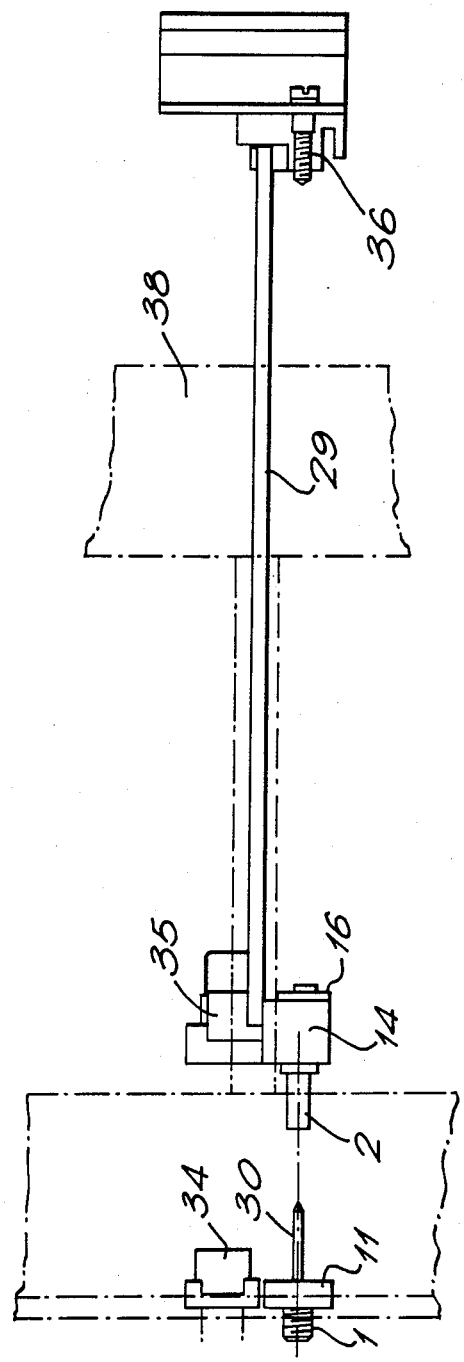
FIG. 5 shows a plan-view of FIG. 4.
Figure 6:
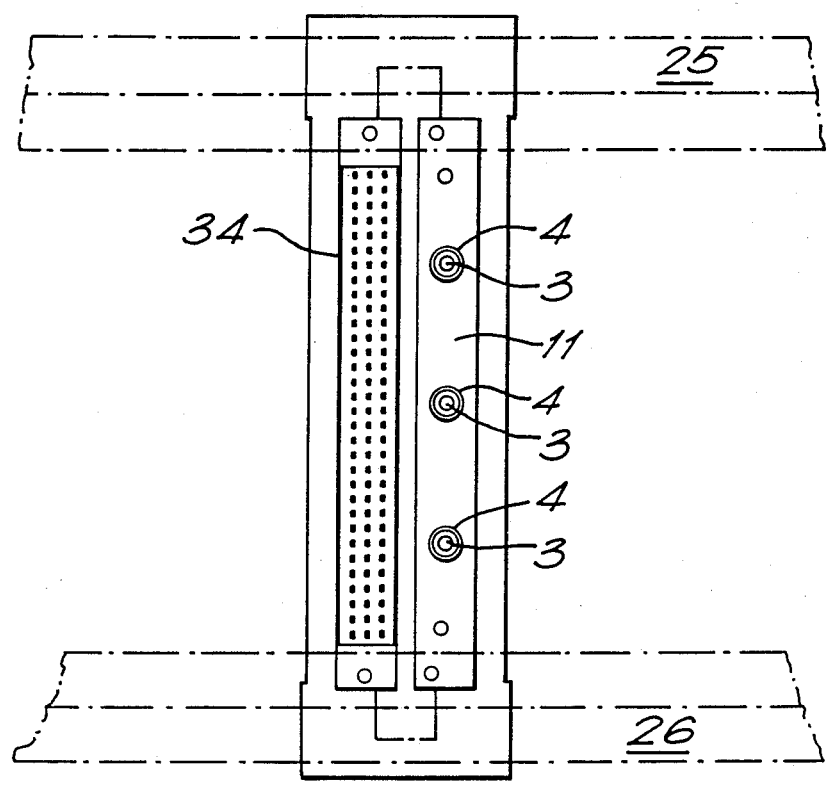
FIG. 6 shows an end-elevation of FIG. 5.

FIG. 4 shows a plurality (three) of optical adaptor means mounted on the back-plane and printed circuit board 29 respectively. In FIG. 4 the printed circuit board 29 is shown partially withdrawn, and it will be seen that the support member 11 incorporates two pins 30 and 31, positioned at opposite ends of the member. cooperating holes 32 and 33 positioned at opposite ends of the further support member 14 are provided to accommodate the pins 30 and 31 and assist in accurate alignment of the two-part adapters as the plug-in printed circuit board 29 is slidably pushed home to effect mating of DIN 41612 electrical connectors 34 and 35 (see FIG. 5).

Standard securing arrangements for the printed circuit board are shown in the form of screws 36 and 37 which are screwed into appropriate holes (not shown) in a main shelf assembly 38 and 39.

Accordingly this arrangement enables active board-mounted devices to be interfaced to standard optical fibre connectors (SMA, ST etc.) which remain permanently connected at the rear of the back-plane assembly alongside the DIN 41612 electrical connectors. There is no requirement for in.ter-link cables between back plane and printed circuit boards and hence no need for dable slack to remove a printed circuit board.

Accordingly printed circuit boards can simply be removed from the shelf assembly to break all optical connections. To re-connect these optical connections, the card is simply re-inserted.

It should be understood that although the optical fibre connector shown in the described embodiment incorporates a threaded attachment means, other attachment, for instance, a bayonet type, could be employed.

Additionally, it should also be understood that while the adapter means are shown mounted adjacent DIN 41612 electrical connectors, they could be placed in any convenient location at the rear of the printed circuit board, even conveniently within apertures on the DIN 41612 connector itself.

What is claimed is:

1. A two-part optical fibre adapter means comprising in combination: a first part which is secured on a support member, said first part including attachment means for attaching an optical fibre connector thereto; and a second part incorporating an active opto-electronic device, said second part incorporating resilient means for resiliently mounting said second part on a further support member to enable dynamic alignment with , and slidable location within, said first part during insertion of said second part into said first part for directly optically coupling said active opto-electronic device and said optical fibre connector.

2. A two-part optical fibre adapter means as claimed in claim 1, wherein the one part is of cylindrical configuration and has a central through-bore and is firmly secured within an aperture incorporated in the support member.

3. A two part optical fibre adapter means as claimed in claim 2, wherein the attachment means is an external thread, which enables the attachment of said optical fibre connector to said one part.

4. A two part optical fibre adapter means as claimed in claim 3, wherein the optical fibre connector is of the male type having a central protruding pin, wherein the central protruding pin locates loosely and centrally within the central through-bore of said one part.

5. A two-part optical fibre adapter means as claimed in claim 1, wherein the other part, taking the form of a spigot, is held in one position in an aperture in the further support member by said resilient means which is axially effective, whereby said other part is capable of movement longitudinally against the resilient means, and also laterally as a consequence of a differential in the diameter dimensions of the aperture and the spigot.

6. A two-part optical fibre adapter means as claimed in claim 5, wherein the spigot is of an increasing diameter stepped cylindrical configuration and incorporates a central through-bore which opens into a cavity at an end of the spigot having a larger diameter.

7. A two-part optical fibre adapter means as claimed in claim 6, wherein the cavity contains the active opto-electronic device.

8. A two-part optical fibre adapter means as claimed in claim 7, wherein the active opto-electronic device is a light emitting diode.

9. A two-part optical fibre adapter means as claimed in claim 7, wherein the active opto-electronic device is a photo-detector.

10. A two-part optical fibre adapter means as claimed in claim 6, wherein a first step of the spigot limits the degree of insertion of the spigot within the central bore of the one part.

11. A two-part optical fibre adapter means as claimed in claim 6, wherein a second step contains the spigot within the aperture on the further support member under the pressure of the resilient means.

12. A two-part optical fibre adapter means as claimed in claims 5 or 11 wherein the resilient means is a helical spring contained in the further support member by a securing means.

13. A two-part optical fibre adapter means as claimed in claim 1, wherein the support member comprises a plate which incorporates at least one pin which is arranged for co-operation with an appropriately positioned hole within the further support member.

14. A two-part optical fibre adapter means as claimed in claim 12, hwerein the support member is mounted adjacent one part of a standard printed circuit board electrical connector on a back-plane assembly of an electronic equipment shelf.

15. A two-part optical fibre adapter means as claimed in claim 13, wherein the support member is mounted adjacent one part of a standard printed circuit board electrical connector on a back-plane assembly of an electronic equipment shelf.

16. A two-part optical fibre assembly means as claimed in claim 14, wherein the further support member is mounted adjacent the corresponding cooperating other part of the standard printed circuit board electrical connector on a plug-in printed circuit board assembly.

17. A two-part optical fibre adapter means as claimed in claim 15, hwerein the further support member is mounted adjacent the corresponding cooperating other part of the standard printed circuit board connector on a plug-in printed circuit board assembly.

18. A two-part optical fibre adapter means as claimed in claim 1 in combination with an electronic equipment shelf assembly including a back-plane and slidably mounted plug-in printed circuit boards for direct coupling between active opto-electronic devices on the printed circuit board and optical fibre connector means on the back-plane.

19. An optical fibre adapter assembly for connecting an optical fibre to an active opto-electronic device, wherein the assembly comprises a first part for receiving a removable optical fibre connector and for mounting on a first support member, and a second part including resilient means for resiliently mounting the second part on a second support member which is displaceable with respect to the first support member, the second part mounting said optoelectronic device and being shaped ot locate slidably within said first part for aligning the second part with respect to the first part when the support members are brought together and thereby to allow direct optical coupling between the opto-electronic device and an optical fibre associated with said connector.

20. In a printed circuit board frame system, the combination of a printed circuit board frame having means for attaching thereto at least one optical fibre, and at least one plug-in printed circuit board to be received in the frame, the board carrying at least one opto-electronic transducer for coupling to said at least one fibre, the improvement comprising:

a first support member forming part of the frame, a first adapter part mounted on said first support member and shaped to receive an optical fibre connector secured to said at least one optical fibre, a second support member mounted on the board and arranged to be located in registry with said first support member when the board is inserted in the frame, and a second adapter part housing said at least one transducer, and being resiliently mounted on said second support member and shaped to locate slidably within said first adapter part when said first and second support members are brought into registry, thereby aligning said optical fibre with said transducer and allowing direct optical coupling between the fibre and the transducer.

* * * * *